United States Patent [19]

Fitser et al.

[11] Patent Number: 5,631,904
[45] Date of Patent: May 20, 1997

[54] METHOD FOR AUTOMATICALLY ESTABLISHING A CONFERENCE CALL

[75] Inventors: Mark A. Fitser, Stanhope; Robert M. Rubin, Morristown, both of N.J.

[73] Assignee: Lucent Technologies Inc., Murray Hill, N.J.

[21] Appl. No.: 631,347

[22] Filed: Apr. 12, 1996

Related U.S. Application Data

[63] Continuation of Ser. No. 342,969, Nov. 21, 1994, abandoned.

[51] Int. Cl.⁶ .................................................. H04M 3/42
[52] U.S. Cl. ........................... 370/261; 379/95; 379/127; 379/205
[58] Field of Search .......................... 370/62, 110.1; 379/95, 96, 114, 115, 121, 127, 158, 202, 204, 205, 206

[56] References Cited

U.S. PATENT DOCUMENTS

| | | | |
|---|---|---|---|
| 4,540,850 | 9/1985 | Herr et al. | 179/2 DP |
| 4,544,804 | 10/1985 | Herr et al. | 179/18 BC |
| 4,550,224 | 10/1985 | Winchell | 179/18 BC |
| 4,577,065 | 3/1986 | Frey et al. | 179/18 BC |
| 4,635,251 | 1/1987 | Stanley et al. | 370/62 |
| 4,796,293 | 1/1989 | Blinken et al. | 379/202 |
| 5,381,467 | 1/1995 | Rosinski et al. | 379/121 |
| 5,408,518 | 4/1995 | Yunoki | 379/202 X |

OTHER PUBLICATIONS

FCC Tariff No. 1 issued Jan. 25, 1994, Section 4, Conference Services.

*Primary Examiner*—Douglas W. Olms
*Assistant Examiner*—Russell W. Blum

[57] ABSTRACT

Methods and apparatus are disclosed for automatically establishing a conference call to a preselected list of prospective participants to the conference call. A subscriber to the conference calling service predefines one or more lists of participants, each list being associated with a different conference call. When the subscriber wishes to initiate a conference call, the subscriber accesses the network and requests that the call be set up. The network originates (e.g., dials) calls to each of the participants on a specified list. The network then bridges these individual calls to establish the conference call. The cost of the conference call can be billed to the subscriber or shared among the participants to the call.

20 Claims, 3 Drawing Sheets

| |
|---|
| SUBSCRIBER IDENTIFIER — 52 |
| PIN — 54 |
| GROUP IDENTIFIER — 56 |
| TELEPHONE NUMBER — 57 |
| GLOBAL BILLING INDICATOR — 58 |
| TEMP. DIAL # — 59 |
| ADDITIONAL PIN — 66 |
| TELEPHONE NUMBER 1 — 60 |
| SPECIAL BILLING INDICATOR 1 — 68 |
| "BILL TO" TELEPHONE # — 73 |
| LABEL 1 — 70 |
| TELEPHONE NUMBER 2 — 62 |
| SPECIAL BILLING INDICATOR 2 — 69 |
| LABEL 2 — 71 |
| TELEPHONE NUMBER 3 — 64 |
| LABEL 3 — 72 |
| NUMBER OF PEOPLE ON LIST — 74 |
| VIDEO INDICATOR — 76 |
| MISC. INFORMATION — 78 |

METHOD FOR AUTOMATICALLY
ESTABLISHING A CONFERENCE CALL

This application is a continuation of application Ser. No. 08/342,969, filed on Nov. 21, 1994, now abandoned.

TECHNICAL FIELD

This invention relates to methods and apparatus for establishing a call between several parties.

BACKGROUND OF THE INVENTION

There are several arrangements known in the art for establishing a conference call between three or more parties. One method for establishing a conference call involves having a person call each party to the conference and individually bridge each called party onto the conference call. While several people can be added to a single call in a straightforward manner, this technique is limited in the number of parties that can be added to a call without degrading the quality of the telephone service. A straightforward bridging of several calls reduces the amount of power which can be transmitted to any party. Also, this technique requires that the party establishing the conference call ("the host") individually call each participant. This is time-consuming and requires that the host have available each time the conference call is to be set up, the telephone numbers of each of the participants.

A second technique for establishing a conference call involves providing a "dial-in" telephone number, which is accessed through the use of an access code, to join all parties at a common bridge. This technique provides significantly improved performance and auditory quality for conference calls involving a large number of participants. Also, each participant dials in to the bridge, eliminating the need for the host to dial each participant individually. Nevertheless this technique requires that the conference call be prearranged so that a dial-in number and access code can be assigned for the call. Each participant must know of the call beforehand to be able to participate.

SUMMARY OF THE INVENTION

Increased calling convenience is provided in accordance with the invention by establishing a preselected list of prospective participants to a conference call and allowing a conference call customer (a "subscriber") to cause the communications network to initiate the conference call to the list of participants. The conference call service subscriber predefines one or more lists of participants, each list being associated with a conference call. When the subscriber wishes to initiate a conference call, the subscriber simply accesses the network and instructs the network to originate (e.g., dial) calls to each of the participants on a specified list. The network then bridges the individual calls to establish the conference call.

In an exemplary embodiment of the invention, a subscriber accesses a platform and directs equipment within the communications network to initiate a conference call to a predetermined list of participants stored in a database within the network. A "group identifier" is provided to uniquely identify each list of participants. The cost of the conference call can be billed to the subscriber or shared among the participants to the call.

BRIEF DESCRIPTION OF THE DRAWINGS

In the drawings:

FIG. 4 is a diagram of an exemplary format for a database record in accordance with the principles of the invention.

DETAILED DESCRIPTION

We have recognized that a subscriber may predefine a list of participants to a conference call and cause the communications network to initiate the conference call for the subscriber. In a novel departure from the prior art, this invention provides a method for the subscriber to define several groups of frequently called participants. For example, the subscriber may define one group to include close family members. The subscriber may define a second group to include an extended list of family members. Another group may be defined to include a project team for work, while still another group is defined to include members of a civic organization.

Figure 1:
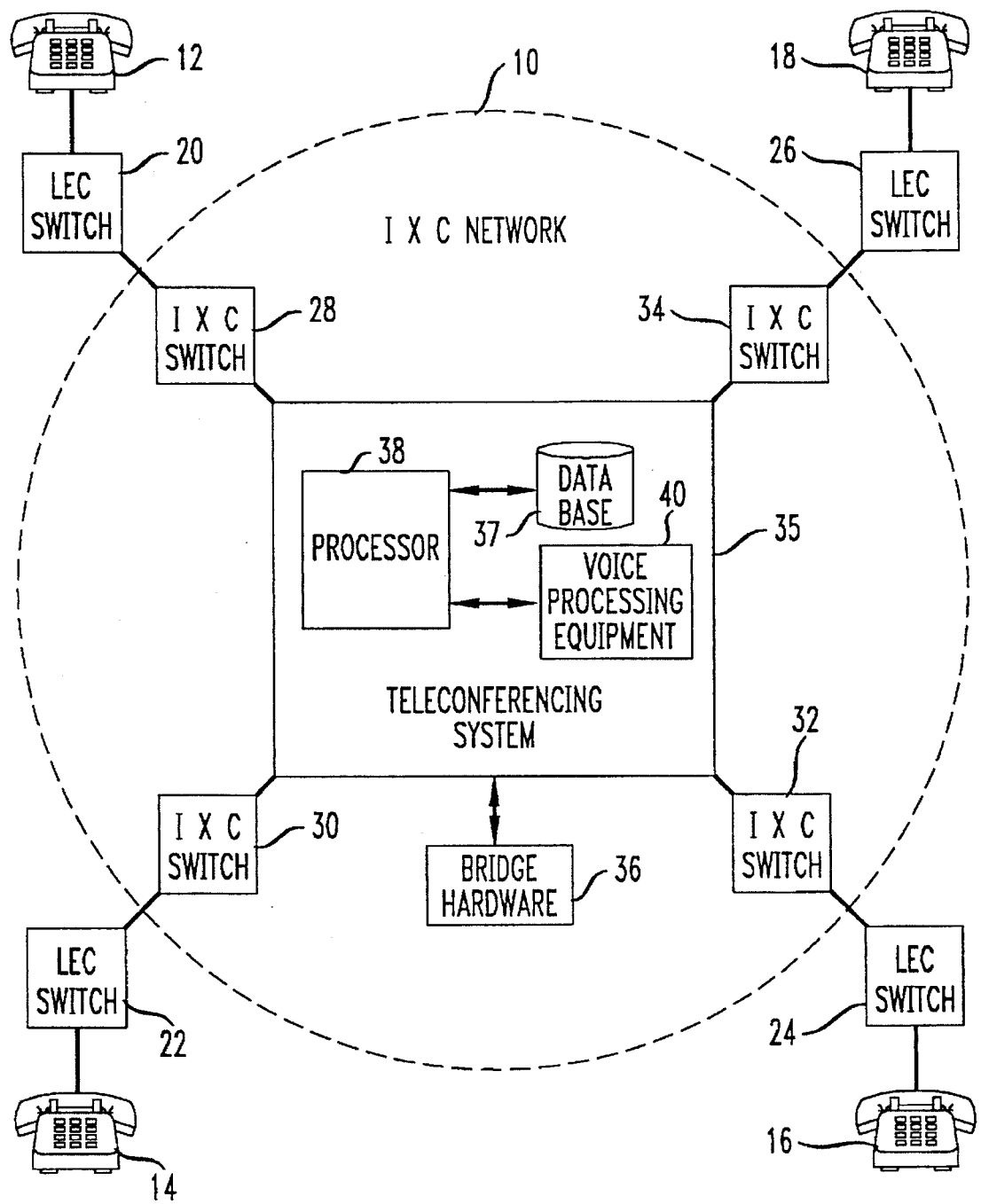
FIG. 1 is a simplified block diagram of a portion of a telecommunications network suitable for conference calling in accordance with the principles of the invention.

Referring now to FIG. 1, an interexchange carrier (IXC) network 10 is shown connected to a plurality of telephone stations 12, 14, 16, and 18, through local exchange carrier (LEC) switches 20, 22, 24, and 26, respectively. IXC network 10 includes IXC switches 28, 30, 32, and 34, teleconferencing system 35, and telephone bridge hardware 36. Teleconferencing system 35 includes a database 37, a processor 38, and voice processing equipment 40. The IXC and LEC switches illustratively are 4ESS™ and 5ESS® switches, respectively, which are commercially available from AT&T Corp. Bridge hardware 36 may be implemented using bridge hardware (which, as used herein also refers to any necessary software) commercially available from Ovation Corp. or Centigram Corp. and arranged in the network such that it is shared by several platforms. The voice processing equipment 40 illustratively comprises Conversant® speech processing equipment from AT&T and, where appropriate, commercially available speech and voice recognition equipment. Although the invention will be described herein in the context of equipment implemented in an IXC network, one skilled in the art will appreciate that the invention also could be implemented in a local exchange carrier's network. Also, elements which are shown as part of teleconferencing system 35 (e.g., database 37 and voice processing equipment 40) could be implemented as separate components of the network, and bridge hardware 36 could be implemented as part of the teleconferencing platform.

Processor 38 has four primary functions. First, processor 38 creates and modifies records that are stored within database 37 to define a subscriber's calling lists and account preferences. Second, processor 38 performs a security function of ensuring that only authorized callers (e.g., a subscriber and his or her designees) are allowed to initiate conference calls. Third, processor 38 performs the function of interacting with bridge hardware 36 (and the software associated with hardware 36) to establish and terminate conference calls. Fourth, processor 38 controls voice processing equipment 40. Processor 38 may be implemented using any convenient processor which can perform these functions. One example of suitable equipment is a network control point commercially available from AT&T Corp.

At a high level, the process for setting up a call in accordance with one aspect of the invention involves obtaining information to identify a subscriber and using that information to retrieve calling information from a database, authenticating the subscriber's identity, identifying a group of prospective participants to a call, dialing the telephone numbers of participants, and subsequently bridging calls to establish the conference call.

In an illustrative embodiment of the invention, a subscriber at telephone station 12 accesses the teleconferencing platform (i.e., teleconferencing system 35) by dialing a toll-free or so-called "800 number." The 800 number connects the subscriber to the teleconferencing platform, for example, via an AT&T 800 Megacom platform. When the call from the subscriber reaches the platform, processor 38 receives and captures the automatic number identifier (ANI) of telephone station 12, together with the dialed 800 number. Processor 38 uses the ANI (or another convenient subscriber identifier as described below) to retrieve from database 37 one or more records which include information about the subscriber's pre-defined calling groups. (As will be described below in greater detail with respect to FIG. 4, a separate record preferably is provided for each calling group defined by the subscriber.) The retrieved records are stored within a temporary memory (not shown) associated with processor 38. Voice processing unit 40, under the control of processor 38, requests a personal identification number or "PIN" from the subscriber. When the subscriber enters a PIN, processor 38 compares the PIN with a pre-defined PIN (which may include letters as well as numbers) stored in the records in the temporary memory as a security measure to determine whether to continue processing the call. The subscriber may enter the PIN by keying selected dual-tone multifrequency (DTMF) digits from a telephone keypad. Alternatively, the subscriber may speak the PIN, which is recognized using conventional speech recognition (speaker independent) or voice recognition (speaker dependent) techniques.

Additional flexibility can be provided to allow a subscriber to access the conference calling capability of the invention from telephones other than the subscriber's "home" telephone by requesting the subscriber to "press 1" if calling from home, or to directly enter the subscriber identifier. If the caller has entered a "1" to indicate that the call originated at home, processor 38 uses the subscriber's ANI as the subscriber identifier, as discussed above. Otherwise, processor 38 uses the subscriber-specified identifier.

Once the system has identified the subscriber and verified the subscriber's authority to use the system, the subscriber can use and customize the conference calling features of the subscriber's telephone service through a multi-level menu arrangement. The menu comprises different tiers represented as instructions stored in processor 38. The subscriber is given the option to: (1) place a call, (2) schedule a call, (3) create a group identifier and a list of participants, or (4) modify an existing group. The menu is communicated to the subscriber, and menu selections are received from the subscriber through the use of voice processing equipment 40 under control of processor 38. The following paragraphs, together with FIGS. 2 and 3, illustrate the operation of a system embodying the invention.

Figure 2:
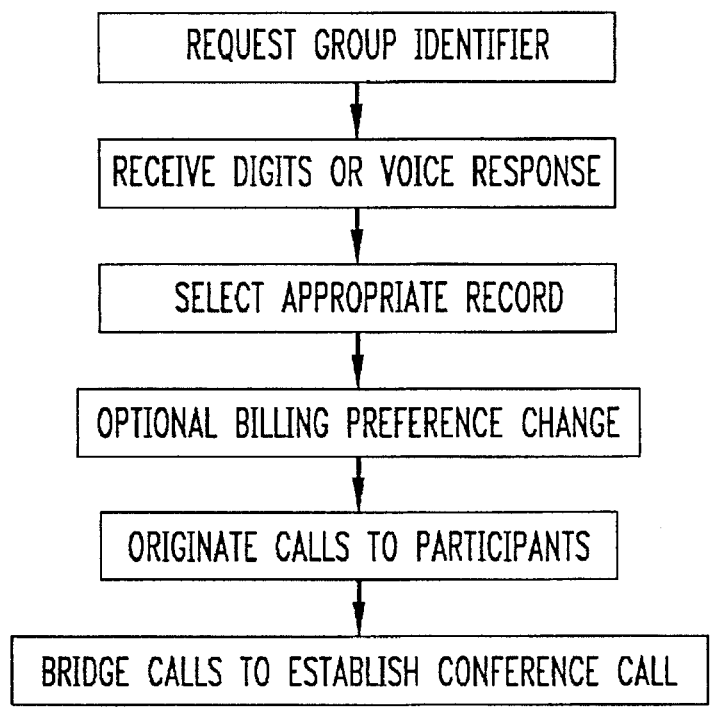
FIG. 2 is a flowchart of the process for placing a call in accordance with the invention.
Figure 3:
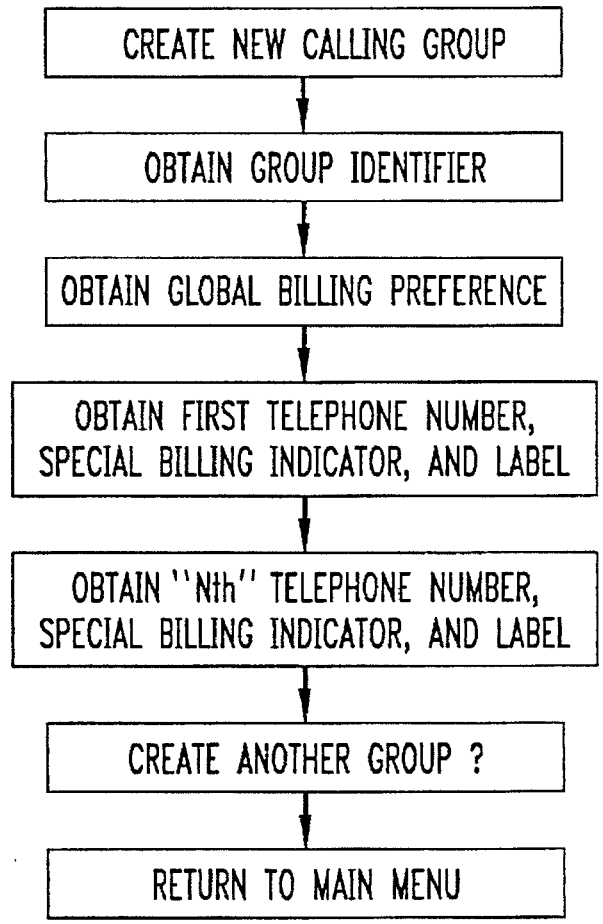
FIG. 3 is a flowchart of the process for creating a record for a new conference call group.

FIG. 2 shows the process for placing a call following subscriber identification and authentication. First, voice processing equipment 40 requests the caller to specify a group identifier. The group identifier uniquely identifies a group of participants to a conference call. More particularly, the group identifier uniquely identifies the one record of the several records associated with a particular subscriber that will be used to set up a particular conference call. The subscriber specifies the group identifier, either by entering DTMF digits or by speaking a group identifier that can be recognized using conventional speech or voice recognition techniques. Processor 38 uses the specified group identifier to select a particular one of the subscriber's records.

Voice processing equipment 40 then plays an announcement such as "please hold while I establish the call." Processor 38 then causes bridge hardware 36 to originate calls to each of the destinations (telephone numbers) specified in the record, for example, to telephone stations 14, 16, and 18 of FIG. 1. The calls to the individual participants are originated automatically, that is, without further action by the subscriber. Each called participant then is bridged onto the conference call with the subscriber. Rather than maintaining the original connection with the subscriber through the 800 number platform, it may be advantageous to disconnect the call between the subscriber and the platform and have bridge hardware 36 dial out to the subscriber. The subscriber is bridged to conference call in the same manner as other participants. The conference call proceeds in a conventional manner and is terminated when the various participants disconnect from the bridge (e.g., when each participant "hangs up").

In accordance with an aspect of the invention, the subscriber is given the option of scheduling a conference call with a particular calling group take place at a predetermined time in the future. For example, a subscriber may pre-arrange to have a conference call with the "family" calling group (for which the subscriber has defined a record and a group identifier) at a specified date and time in the future when all members of the group will be available, perhaps a week in advance. Alternatively, the subscriber may schedule a conference call to be held every Sunday evening at 8 p.m. with the "family" calling group. One skilled in the art will readily appreciate that, in view of this disclosure, the current scheduling capability of commercially-available telephone bridge equipment can be readily modified to schedule conference calls in accordance with the principles of the invention.

FIG. 3 shows a flowchart of an exemplary process for creating a new calling list or group. After receiving an indication from the subscriber that the subscriber wishes to create a new list, processor 38 causes voice processing equipment 40 to instruct the subscriber to provide a group identifier. The group identifier could be one or more alphanumeric characters, and preferably is a custom label such as "family," "school," "soccer team," or "work project XYZ" to facilitate easy and unique identification of a calling group. Voice processing equipment 40 then request the subscriber to select a global billing option preference to be used to bill for the call. The subscriber is then asked to provide a list of telephone numbers that will be used to set up a conference call with the identified group. The subscriber enters telephone numbers, separated by a delimiter such as the "#" symbol by pressing DTMF keys on a telephone keypad, or by speaking the telephone number. Processor 38 can be programmed to prompt the subscriber for a label to be associated with each telephone number (e.g., the label may be the name of the participant associated with a given telephone number) and any special billing treatment to be applied to that leg of the conference call. When the telephone numbers of all of the prospective conference call participants have been entered, voice processing equipment 40 queries the subscriber as to whether the subscriber wishes to create another calling group. If the subscriber elects to create a new group, the process is repeated. Otherwise, the subscriber is returned to the initial menu.

FIG. 4 shows an exemplary record 50. Record 50 includes a subscriber identifier field 52, a subscriber PIN field 54, a group identifier field 56, a telephone number field 57, a global billing indicator field 58, a "temporary dial number" field 59, and several fields which store telephone numbers of prospective participants to a conference call (illustratively shown as telephone number fields 60, 62, and 64). The subscriber identifier and PIN, stored in fields 52 and 54, respectively, are identical for all records associated with a particular subscriber so as to uniquely associate the records with that subscriber. The information contained in the remaining fields within record 50 vary from record to record so that each calling group (identified by the unique group identifier stored within group identifier field 56) may include different participants, billing preferences, and other optional information unique to the particular calling group. The subscriber identifier may be the ANI of the subscriber's home telephone or any other suitable identifier. Using the subscriber's ANI as the subscriber identifier may be convenient because this information can be captured from the signaling messages used to set up the call and automatically passed to processor 38, thereby eliminating the need to collect a subscriber identifier from the subscriber.

Telephone number field 57 stores the subscriber's telephone number. This information is necessary when bridge hardware 36 must dial out to the subscriber when setting up a conference call. The global billing indicator stored within field 58 indicates the payment option selected by the subscriber for the particular calling group. The payment options could be, for example, that the subscriber pays all costs for the conference call, or that all parties pay a proportionate share of the costs for the conference call. (Methods and apparatus for billing separately for each "leg" of a conference call are disclosed in U.S. Pat. No. 4,481,383 issued Nov. 6, 1984 to Madon et al., which is hereby incorporated by reference.) Regardless of the setting of the global billing indicator, an option can be provided to override the global billing treatment on a call by call basis. This may be accomplished by causing voice processing equipment 40 to play an announcement to the subscriber when the conference call is requested asking whether the subscriber wishes to change the billing arrangements for the call. Temporary dial number field 59 stores a telephone number which is used to reach the subscriber under selected circumstances. When used, the temporary dial telephone number replaces the default telephone number specified in field 57. The temporary dial telephone number may be used, for example, when the subscriber is traveling away from home or work but still wishes to establish the conference call to the conference call group identified in the record.

Record 50 preferably includes several additional fields for storing information. These fields include additional PIN field 66, special billing indicator fields 68 and 69, label fields 70, 71, and 71, a "bill to" telephone number field 73, a "number of participants" field 74, a video indicator field 76, and one or more miscellaneous fields for storing information which makes call processing more efficient (e.g., field 78). Additional PIN field 66 enables the subscriber to specify a PIN that can be used by other callers to place a call to the identified group. A caller providing a PIN which matches the data in this field will be allowed to place a call but will not be allowed to change the participants to the group or change any billing options. Special billing indicators stored in fields 68 and 69 are supplemental to the global billing indicator and are associated with a respective one of telephone number fields 60 and 62 to enable the subscriber to override the global billing preference specified by global billing indicator 58 on a participant-by-participant basis. For example, global billing indicator 58 may specify that each participant to a conference call pay a respective share of the telecommunications cost for the call. Special billing indicator 69 may be used to specify that the subscriber will pay the charges associated with the call placed to the telephone number specified in telephone number field 62. Labels stored within fields 70, 71, and 72 are associated with each of the telephone numbers in fields 60, 62, and 64, respectively, to facilitate easy identification of the participant to be reached at the telephone numbers in fields 60, 62, and 64. A "bill to" telephone number may be provided in field 73 and associated with a telephone number to be dialed (field 60) to identify a billing number, such as a telephone number or credit card number, to be billed for the call. This "bill to" number may be convenient if the telephone number specified in field 60 is a number that cannot or should not be billed for the call (e.g., a pay phone or hotel room phone). The number of participants field 74 stores the total number of telephone number fields specified for the group identifier. Video indicator 76 indicates whether the call will be a video conference call.

Should the subscriber decide to modify an existing calling group record, the subscriber is given the option of (1) deleting a group or changing a group name, (2) changing the global billing indicator, and (3) changing information about the participants of a specified calling group. With regard to item 3, above, the subscriber may add or delete participants, change the telephone number or label associated with a given participant, or change the billing option for a particular participant. A "review" function preferably is provided to facilitate revising the record. The review function would cause voice processing equipment 40 to recite the current information or subscriber's selections within the record. For example, if a subscriber elected to "review" the contents of the record for a particular calling group, voice processing equipment 40 would recite the names (i.e., labels) associated with each of the telephone numbers in the defined group. If the subscriber elected to modify the information associated with a particular participant, the voice processing equipment would recite the current information stored for the participant (e.g., label, telephone number, special billing preference, and "bill to" telephone number).

As described above, various arrangements can be made to bill for calls placed in accordance with the invention. One option is to have the subscriber pay for calls to one or more of the participants. When the subscriber has elected to bear the cost of the call, it is desirable to cause voice processing equipment 40 to generate and deliver a message to the called participant indicating that the subscriber will pay for the call. By informing the prospective participant that the subscriber will pay, the possibility that the participant will terminate the call is minimized, because the participant knows that he or she will not be billed. Conversely, when each prospective participant is expected to pay a share of the cost, it is desirable to inform the participant of this fact and give the participant an opportunity to accept or deny the charges. Voice processing equipment 40 interacts with the prospective participant to obtain this information after the call is established, but prior to bridging the participant onto the conference call. Bridge hardware 36 performs the actual billing, including the generation of billing records, using techniques well known in the art.

Arrangements can be made to deal with situations where a dialed participant is unavailable or the call is answered by an answering machine. Voice processing equipment 40, under the control of processor 38, can play announcements to a party answering a telephone call that the call is for a particular person. For example, the equipment may play an instruction message such as: "This is a conference call for Tom Smith—to participate, please remain on the line." Alternatively, the voice processing equipment may instruct the call recipient to "press '1' to join the conference call or hang up if you do not wish to join the call." Calls answered by an answering machine, which cannot respond to the instructions given, will receive an appropriate message, including instructions for the participant to join the call in-progress.

Bridge hardware 36 preferably generates a signal, such as an audible tone, as additional participants are added to the call. Because processor 38 has available to it the dialed numbers, processor 38 also could cause voice processing hardware 40 to generate an announcement specifying the telephone number of the participant joining the call. As previously discussed, labels can be associated with each telephone number in record 50. These labels can be announced when the party at the respective telephone number has joined the call. For example, the label "Mary" could be specified within field 70 and associated with the telephone number in field 60. When a call is originated to the number in field 60, processor 38 would cause voice processing equipment 40 to announce "Mary has just joined the call."

At the end of a conference call, all of the participants are disconnected from bridge hardware 36 and the records are discarded from the temporary memory of processor 38. One skilled in the art will readily appreciate that the system could be modified without departing from the scope of the invention to enable the subscriber to retain contact with processor 38 and be provided with access to the main menu. This provides the subscriber with an opportunity to initiate a second conference call to another calling group or to modify a calling list while eliminating the need for the subscriber to re-dial the 800 access number and to re-enter the subscriber identifier and PIN. The subscriber simply remains on the line after all other participants have disconnected from the bridge, or enters a predetermined sequence of DTMF signals recognized by bridge hardware 36 as a command to return the subscriber to the main menu.

We claim:

1. A call processing method comprising the steps of:
    receiving in a communications network an initiating telephone call requesting to establish a conference call between a plurality of participants identified from a data record that corresponds to an Automatic Number Identification of a subscriber that placed the initiating telephone call;
    responsive to the Automatic Number Identification, automatically originating a call to a plurality of preselected telephone stations each associated with a respective one of the plurality of participants identified in the data record corresponding to the Automatic Number Identification; and
    bridging the calls to the plurality of preselected telephone stations.

2. The method according to claim 1 wherein the data record corresponding to the Automatic Number Identification specifies a group identifier which uniquely identifies a plurality of preselected telephone stations.

3. The method of claim 2 wherein the record further comprises a billing indicator indicative of billing treatment to be used for all of the plurality of participants.

4. The method of claim 3 wherein the record further comprises a supplemental billing indicator indicative of billing treatment to be used for a predetermined one of the plurality of participants.

5. The method of claim 2 wherein the record further comprises a label which identifies which of the plurality of participants is associated with a selected one of the telephone numbers.

6. The method of claim 2 wherein the record further comprises a billing number to which charges for the call originated to a selected one of the telephone numbers is to be billed.

7. The method of claim 1 wherein the record further comprises information identifying a person authorized to make the initiating telephone call to establish the conference call.

8. The method of claim 1 further comprising the step of announcing the identity of one of the plurality of participants to the conference call.

9. The method of claim 1 further comprising the step of querying one of the plurality of participants to determine whether the participant will accept at least a portion of the charges for the conference call.

10. The method of claim 1 further comprising the step of announcing to one of the plurality of participants information identifying a party to be billed for at least a portion of the charges for the conference call.

11. A method for establishing a conference call between a plurality of participants, the method comprising the steps of:
    receiving an initiating telephone call requesting to establish a conference call between a conference call group comprising a plurality of participants, the conference call group being identified by a group identifier associated with an Automatic Number Identification of a subscriber that placed the initiating telephone call;
    responsive to the request, accessing a data base which stores information identifying the conference call group associated with the group identifier, to obtain a plurality of telephone numbers to be dialed to establish the conference call between participants;
    automatically originating a call to a plurality of telephone stations identified by a respective one of the plurality of telephone numbers; and
    bridging the calls to the plurality of telephone stations so as to establish the conference call.

12. The method of claim 11 further comprising the step of storing in the database information identifying a conference call group, the information associated with said group identifier, information identifying a person authorized to make a request to originate the conference call, and a plurality of telephone numbers to be dialed to establish the conference call between the participants.

13. The method of claim 11 wherein the information stored in the database further comprises a billing indicator indicative of billing treatment to be used for all of the plurality of participants.

14. The method of claim 11 wherein the information stored in the database further comprises a supplemental billing indicator indicative of billing treatment to be used for a predetermined one of the plurality of participants.

15. The method of claim 11 wherein the information stored in the database further comprises a label which identifies which of the plurality of participants is associated with a selected one of the telephone numbers.

16. The method of claim 11 wherein the information stored in the database further comprises a billing number to which charges for the call originated to a selected one of the telephone numbers is to be billed.

17. The method of claim 11 further comprising the step of announcing the identity of at least one of the plurality of participants to the conference call.

18. The method of claim 11 further comprising the step of querying one of the plurality of participants to determine whether the participant will accept at least a portion of the charges for the conference call.

19. The method of claim 11 further comprising the step of announcing to one of the plurality of participants information identifying a party to be billed for at least a portion of the charges for the conference call.

20. The method of claim 11 wherein the request to establish a conference call comprises a request to schedule a conference call between the plurality of participants at a predetermined time in the future.

* * * * *